United States Patent
Muhlestein

(10) Patent No.: US 7,346,928 B1
(45) Date of Patent: Mar. 18, 2008

(54) DECENTRALIZED APPLIANCE VIRUS SCANNING

(75) Inventor: Mark Muhlestein, Tucson, AZ (US)

(73) Assignee: Network Appliance, Inc., Sunnyvale, CA (US)

( * ) Notice: Subject to any disclaimer, the term of this patent is extended or adjusted under 35 U.S.C. 154(b) by 624 days.

(21) Appl. No.: 09/728,701

(22) Filed: Dec. 1, 2000

(51) Int. Cl.
  *G06F 12/14* (2006.01)
  *G06F 7/00* (2006.01)
  *G08B 23/00* (2006.01)
  *H04L 9/00* (2006.01)

(52) U.S. Cl. .................. 726/24; 726/22; 713/185; 707/1

(58) Field of Classification Search ........... 713/200, 713/201; 707/1; 726/24
See application file for complete search history.

(56) References Cited

U.S. PATENT DOCUMENTS

| | | | |
|---|---|---|---|
| 5,392,446 A | 2/1995 | Tower et al. | |
| 5,604,862 A | 2/1997 | Midgely et al. | |
| 5,623,600 A * | 4/1997 | Ji et al. | 713/201 |
| 5,630,049 A | 5/1997 | Cardoza et al. | |
| 5,649,152 A | 7/1997 | Ohran et al. | |
| 5,771,354 A | 6/1998 | Crawford | |
| 5,787,409 A | 7/1998 | Seiffert et al. | |
| 5,819,292 A | 10/1998 | Hitz et al. | |
| 5,835,953 A | 11/1998 | Ohran | |
| 5,918,008 A * | 6/1999 | Togawa et al. | 713/200 |
| 5,925,126 A | 7/1999 | Hsieh | |
| 5,933,594 A | 8/1999 | La Joie et al. | |
| 5,946,690 A | 8/1999 | Pitts | |
| 5,963,962 A | 10/1999 | Hitz et al. | |
| 5,968,176 A | 10/1999 | Nessett et al. | |
| 6,088,803 A * | 7/2000 | Tso et al. | 726/22 |
| 6,101,558 A | 8/2000 | Utsunomiya et al. | |
| 6,115,741 A | 9/2000 | Domenikos et al. | |
| 6,138,126 A | 10/2000 | Hitz et al. | |

(Continued)

FOREIGN PATENT DOCUMENTS

EP  0 903 901  3/1999

(Continued)

OTHER PUBLICATIONS

Internet Content Adaptation Protocol. iCAP Forum. www.i-cap.org/icap/faqs.cfm. Jul. 13, 2001.

(Continued)

*Primary Examiner*—Christopher Revak
*Assistant Examiner*—Kaveh Abrishamkar
(74) *Attorney, Agent, or Firm*—Blakely Sokoloff Taylor & Zafman LP

(57) ABSTRACT

The invention provides a method and system for scanning specialized computing devices for viruses. In a preferred embodiment, a filer is connected to one or more supplementary computing devices that scan requested files to ensure they are virus free prior to delivery to end users. When an end user requests a file the following steps occur: First, the filer determines whether the file requested must be scanned before delivery to the end user. Second, the filer opens a channel to one of the external computing devices and sends the filename. Third, the external computing device opens the file and scans it. Fourth, the external computing device notifies the filer the results of the file scan operation. Fifth, the filer sends the file to the end user provided the status indicates it may do so.

21 Claims, 2 Drawing Sheets

U.S. PATENT DOCUMENTS

| | | | |
|---|---|---|---|
| 6,189,114 B1 | 2/2001 | Orr | |
| 6,226,752 B1 | 5/2001 | Gupta et al. | |
| 6,237,114 B1 | 5/2001 | Wookey et al. | |
| 6,266,774 B1 * | 7/2001 | Sampath et al. | 713/201 |
| 6,275,939 B1 | 8/2001 | Garrison | |
| 6,327,658 B1 | 12/2001 | Susaki et al. | |
| 6,327,677 B1 | 12/2001 | Garg et al. | |
| 6,338,141 B1 * | 1/2002 | Wells | 713/200 |
| 6,405,327 B1 | 6/2002 | Sipple et al. | |
| 6,560,632 B1 * | 5/2003 | Chess et al. | 709/201 |
| 6,721,721 B1 * | 4/2004 | Bates et al. | 707/1 |
| 6,785,732 B1 * | 8/2004 | Bates et al. | 709/232 |
| 6,918,113 B2 | 7/2005 | Patel et al. | |
| 2002/0103783 A1 | 8/2002 | Muhlestein | |
| 2003/0191957 A1 * | 10/2003 | Hypponen et al. | 713/200 |

FOREIGN PATENT DOCUMENTS

| | | |
|---|---|---|
| JP | 2004/523820 | 8/2004 |
| JP | 2004/523820 A | 8/2004 |
| WO | WO 97/39399 | 10/1997 |
| WO | WO 97/49252 | 12/1997 |
| WO | WO 02/44862 A2 | 6/2002 |
| WO | WO 02/095588 A2 | 11/2002 |

OTHER PUBLICATIONS

Slashdot: Tux2: The Filesystem That Would Be King—Microsoft Internet Explorer. Oct. 20, 2000.

Jieh-Sheng Lee "A Generic Virus Detection Agent on the Internet" System Sciences, 1997, pp. 210-219, vol. 4 Center of Computing Services, Hua-Fan Institute of Technology, Shi-Tang, Taipei, Taiwan.

PCT Search Report; PCT/US0146688; Sep. 22, 2006.

PCT Search Report; PCT/US0151581; Oct. 10, 2006.

Data ONTAP Event Management System, Network Appliance Aug. 10, 2000.

Norton, Peter et al. "Chapter 3—Norton Utilities: The System Doctor is in." and "Chapter 13—Norton Utilities: The Better Part of Valor . . . " Peter Norton's Complete Guide to Norton SystemWorks 2.0, 1999, Sams.

Wybranietz, D. et al. "Monitoring and Performance Measuring Distributed Systems During Operation." Joint International Conference on Measurement and Modeling of Computer Systems, 1988, pp. 197-206, ACM Press, New York, NY.

* cited by examiner

DECENTRALIZED APPLIANCE VIRUS SCANNING

BACKGROUND OF THE INVENTION

1. Field of the Invention

This invention relates to virus scanning in a networked environment.

2. Related Art

Computer networking and the Internet in particular offer end users unprecedented access to information of all types on a global basis. Access to information can be as simple as connecting some type of computing device using a standard phone line to a network. With the proliferation of wireless communication, users can now access computer networks from practically anywhere.

Connectivity of this magnitude has magnified the impact of computer viruses. Viruses such as "Melissa" and "I love you" had a devastating impact on computer systems worldwide. Costs for dealing with viruses are often measured in millions and tens of millions of dollars. Recently it was shown that hand-held computing devices are also susceptible to viruses.

Virus protection software can be very effective in dealing with viruses, and virus protection software is widely available for general computing devices such as personal computers. There are, however, problems unique to specialized computing devices, such as filers (devices dedicated to storage and retrieval of data). Off-the-shelf virus protection software will not run on a specialized computing device unless it is modified to do so, and it can be very expensive to rewrite software to work on another platform.

A first known method is to scan for viruses at the data source. When the data is being provided by a specialized computing device the specialized computing device must be scanned. Device-specific virus protection software must be written in order to scan the files on the device.

While this first known method is effective in scanning files for viruses, it suffers from several drawbacks. First, a company with a specialized computing device would have to dedicate considerable resources to creating virus protection software and maintaining up-to-date data files that protect against new viruses as they emerge.

Additionally, although a manufacturer of a specialized computing device could enlist the assistance of a company that creates mainstream virus protection software to write the custom application and become a licensee this would create other problems, such as reliance on the chosen vendor of the anti-virus software, compatibility issues when hardware upgrades are effected, and a large financial expense.

A second known method for protecting against computer viruses is to have the end user run anti-virus software on their client device. Anti-virus software packages are offered by such companies as McAfee and Symantec. These programs are loaded during the boot stage of a computer and work as a background job monitoring memory and files as they are opened and saved.

While this second known method is effective at intercepting and protecting the client device from infection, it suffers from several drawbacks. It places the burden of detection at the last possible link in the chain. If for any reason the virus is not detected prior to reaching the end user it is now at the computing device where it will do the most damage (corrupting files and spreading to other computer users and systems).

It is much better to sanitize a file at the source from where it may be delivered to millions of end users rather than deliver the file and hope that the end user is pre-pared to deal with the file in the event the file is infected. End users often have older versions of anti-virus software and/or have not updated the data files that ensure the software is able to protect against newly discovered viruses, thus making detection at the point of mass distribution even more critical.

Also, hand-held computing devices are susceptible to viruses, but they are poorly equipped to handle them. Generally, hand-held computing devices have very limited memory resources compared to desktop systems. Dedicating a portion of these resources to virus protection severely limits the ability of the hand-held device to perform effectively. Reliable virus scanning at the information source is the most efficient and effective method.

Protecting against viruses is a constant battle. New viruses are created everyday requiring virus protection software manufacturers to come up with new data files (solution algorithms used by anti-virus applications). By providing protection at the source of the file, viruses can be eliminated more efficiently and effectively.

Security of data in general is important. Equally important is the trust of the end user. This comes from the reputation that precedes a company, and companies that engage in web commerce often live and die by their reputation. Just like an end user trusts that the credit card number they have just disclosed for a web-based sales transaction is secure they want files they receive to be just as secure.

Accordingly, it would be desirable to provide a technique for scanning specialized computing devices for viruses and other malicious or unwanted content that may need to be changed, deleted, or otherwise modified.

SUMMARY OF THE INVENTION

The invention provides a method and system for scanning specialized computing devices (such as filers) for viruses. In a preferred embodiment, a filer is connected to one or more supplementary computing devices that scan requested files to ensure they are virus free prior to delivery to end users. When an end user requests a file from the filer the following steps occur: First, the filer determines whether the file requested must be scanned before delivery to the end user. Second, the filer opens a channel to one of the external computing devices and sends the filename. Third, the external computing device opens the file and scans it. Fourth, the external computing device notifies the filer the status of the file scan operation. Fifth, the filer sends the file to the end user provided the status indicates it may do so.

This system is very efficient and effective as a file needs only to be scanned one time for a virus unless the file has been modified or new data files that protect against new viruses have been added. Scan reports for files that have been scanned may be stored in one or more of the external computing devices, in one or more filers, and some portion of a scan report may be delivered to end users.

In alternative embodiments of the invention one or more of the external computing devices may be running other supplementary applications, such as file compression and encryption, independently or in some combination.

DETAILED DESCRIPTION OF THE PREFERRED EMBODIMENT

Figure 1:
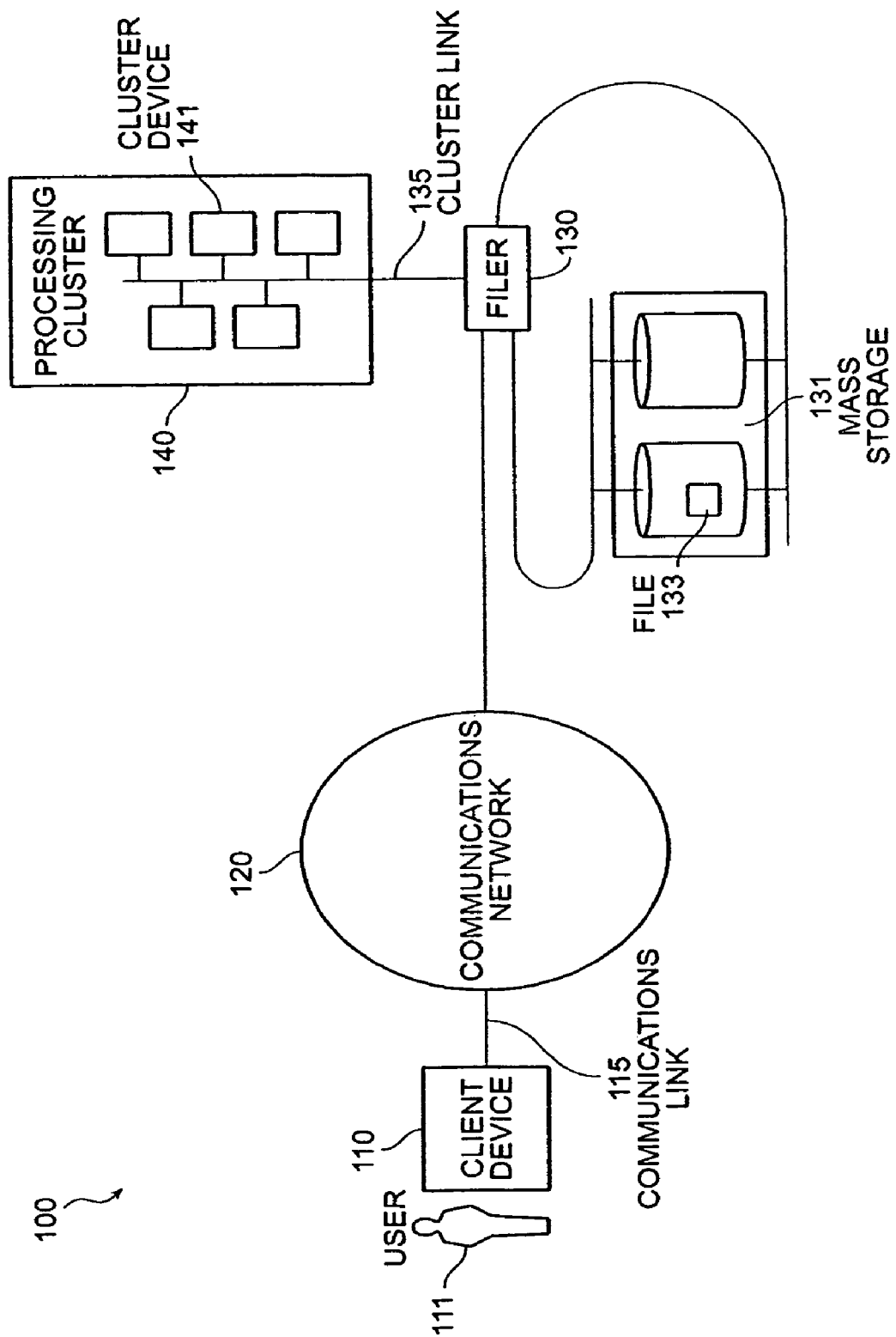
FIG. 1 shows a block diagram of a system for decentralized appliance virus scanning.

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Lexicography

The following terms refer or relate to aspects of the invention as described below. The descriptions of general meanings of these terms are not intended to be limiting, only illustrative.

- Virus—in general, a manmade program or piece of code that is loaded onto a computer without the computer user's knowledge and runs against their wishes. Most viruses can also replicate themselves, and the more dangerous types of viruses are capable of transmitting themselves across networks and bypassing security systems.
- client and server—in general, these terms refer to a relationship between two devices, particularly to their relationship as client and server, not necessarily to any particular physical devices.
- For example, but without limitation, a particular client device in a first relationship with a first server device, can serve as a server device in a second relationship with a second client device. In a preferred embodiment, there are generally a relatively small number of server devices servicing a relatively larger number of client devices.
- client device and server device—in general, these terms refer to devices taking on the role of a client device or a server device in a client-server relationship (such as an HTTP web client and web server). There is no particular requirement that any client devices or server devices must be individual physical devices. They can each be a single device, a set of cooperating devices, a portion of a device, or some combination thereof.
- For example, but without limitation, the client device and the server device in a client-server relation can actually be the same physical device, with a first set of software elements serving to perform client functions and a second set of software elements serving to perform server functions.
- web client and web server (or web site)—as used herein the terms "web client" and "web server" (or "web site") refer to any combination of devices or software taking on the role of a web client or a web server in a client-server environment in the internet, the world wide web, or an equivalent or extension thereof. There is no particular requirement that web clients must be individual devices. They can each be a single device, a set of cooperating devices, a portion of a device, or some combination thereof (such as for example a device providing web server services that acts as an agent of the user).

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 shows a block diagram of a system for decentralized appliance virus scanning.

A system 100 includes a client device 110 associated with a user 111, a communications network 120, a filer 130, and a processing cluster 140.

The client device 110 includes a processor, a main memory, and software for executing instructions (not shown, but understood by one skilled in the art). Although the client device 110 and filer 130 are shown as separate devices there is no requirement that they be physically separate.

In a preferred embodiment, the communication network 120 includes the Internet. In alternative embodiments, the communication network 120 may include alternative forms of communication, such as an intranet, extranet, virtual private network, direct communication links, or some other combination or conjunction thereof.

A communications link 115 operates to couple the client device 110 to the communications network 120.

The filer 130 includes a processor, a main memory, software for executing instructions (not shown, but understood by one skilled in the art), and a mass storage 131. Although the client device 110 and filer 130 are shown as separate devices there is no requirement that they be separate devices. The filer 130 is connected to the communications network 120.

The mass storage 131 includes at least one file 133 that is capable of being requested by a client device 110.

The processing cluster 140 includes one or more cluster device 141 each including a processor, a main memory, software for executing instructions, and a mass storage (not shown but understood by one skilled in the art). Although the filer 130 and the processing cluster 140 are shown as separate devices there is no requirement that they be separate devices.

In a preferred embodiment the processing cluster 140 is a plurality of personal computers in an interconnected cluster capable of intercommunication and direct communication with the filer 130.

The cluster link 135 operates to connect the processing cluster 140 to the filer 130. The cluster link 135 may include non-uniform memory access (NUMA), or communication via an intranet, extranet, virtual private network, direct communication links, or some other combination or conjunction thereof.

Method of Operation

Figure 2:
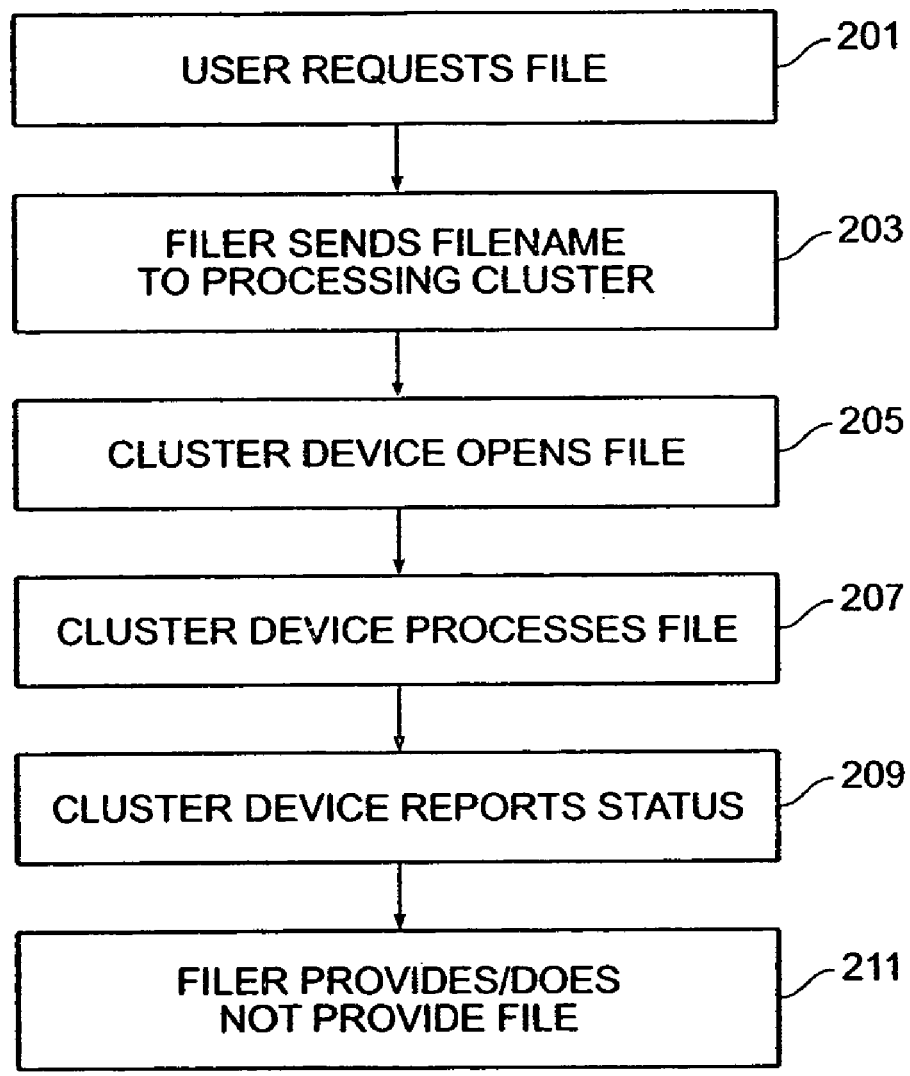
FIG. 2 shows a process flow diagram for a system for decentralized virus scanning

FIG. 2 shows a process flow diagram for a system for decentralized appliance virus scanning.

A method 200 includes a set of flow points and a set of steps. The system 100 performs the method 200. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 200, the system 100 is ready to begin performing the method 200.

At a step 201, a user 111 utilizes the client device 110 to initiate a request for a file 133. The request is transmitted to the filer 130 via the communications network 120. In a preferred embodiment the filer 130 is performing file retrieval and storage at the direction of a web server (not shown but understood by one skilled in the art).

At a step 203, the filer 130 receives the request for the file 133 and sends the file ID and path of the file 133 to the processing cluster 140 where it is received by one of the cluster device 141.

At a step 205, the cluster device 141 uses the file ID and path to open the file 133 in the mass storage 131 of the filer 130.

At a step 207, the cluster device 141 scans the file 133 for viruses. In a preferred embodiment, files are tasked to the processing cluster 140 in a round robin fashion. In alternative embodiments files may be processed individually by a cluster device 141, by multiple cluster device 141 simultaneously, or some combination thereof. Load balancing may be used to ensure maximum efficiency of processing within the processing cluster 140.

There are several vendors offering virus protection software for personal computers, thus the operator of the filer 130 may choose whatever product they would like to use. They may even use combinations of vendors' products in the processing cluster 140. In an alternative embodiment of the invention, continual scanning of every file 133 on the filer 130 may take place.

The processing cluster 140 is highly scalable. The price of personal computers is low compared to dedicated devices, such as filers, therefore this configuration is very desirable. Additionally, a cluster configuration offers redundant systems availability in case a cluster device 141 fails—failover and takeover is also possible within the processing cluster.

At a step 209, the cluster device 141 transmits a scan report to the filer 130. The scan report primarily reports whether the file is safe to send. Further information may be saved for statistical purposes (for example, how many files have been identified as infected, was the virus software able to sanitize the file or was the file deleted) to a database. The database may be consulted to determine whether the file 133 needs to be scanned before delivery upon receipt of a subsequent request. If the file 133 has not changed since it was last scanned and no additional virus data files have been added to the processing cluster, the file 133 probably does not need to be scanned. This means the file 133 can be delivered more quickly.

Other intermediary applications may also run separately, in conjunction with other applications, or in some combination thereof within the processing cluster 140. Compression and encryption utilities are some examples of these applications. These types of applications, including virus scanning, can be very CPU intensive, thus outsourcing can yield better performance by allowing a dedicated device like a filer to do what it does best and farm out other tasks to the processing cluster 140.

At a step 211, the filer 130 transmits or does not transmit the file 133 to the client 110 based on its availability as reported following the scan by the processing cluster 140. Some portion of the scan report may also be transmitted to the user.

At this step, a request for a file 133 has been received, the request has been processed, and if possible a file 133 has been delivered. The process may be repeated at step 201 for subsequent requests.

Generality of the Invention

The invention has wide applicability and generality to other aspects of processing requests for files.

The invention is applicable to one or more of, or some combination of, circumstances such as those involving:
file compression;
file encryption; and
general outsourcing of CPU intensive tasks from dedicated appliances to general purpose computers.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A method implemented in a storage server, the method comprising:
   receiving, at the storage server, requests for a plurality of files maintained by the storage server, from at least one of a plurality of clients of the storage server;
   in response to the requests for the plurality of files, causing, by the storage server, each of a plurality of cluster devices that are external to the storage server and to the plurality of clients to execute an operation on the plurality of files;
   at the storage server, receiving results of the plurality of cluster devices' operations on the plurality of files from the plurality of cluster devices;
   responding to said at least one of the plurality of clients regarding the requests according to said results;
   wherein said operation comprises a virus scan operation; and
   wherein causing, by the storage server, each of a plurality of cluster devices that are external to the storage server to execute an operation on the plurality of files includes sending an identifier and path of each of the plurality of files from the storage server to the plurality of cluster devices.

2. The method of claim 1, wherein said sending is accomplished by using non-uniform access.

3. The method of claim 1, wherein said sending is accomplished by using a communication network.

4. The method of claim 1, wherein said sending is accomplished by using a direct connection.

5. The method of claim 1, wherein responding to said at least one of the plurality of clients regarding the requests according to said results comprises:
   for each of the plurality of files, sending the corresponding file to a client requesting the corresponding file if said results indicate that the corresponding file is safe to send.

6. The method of claim 5, wherein a file is considered to be safe if the file is not infected with any viruses.

7. The method of claim 1, wherein the plurality of cluster devices is a cluster of interconnected personal computers.

8. An apparatus comprising:
   a processor;
   a mass storage facility, the mass storage facility storing a plurality of files;
   a network interface through which to communicate with a plurality of clients;
   a memory coupled to the processor, the memory storing instructions which when executed by the processor, cause the processing system to perform a process, the process comprising:
   receiving requests for the plurality of files from at least one of the plurality of clients;

in response to the requests for the plurality of files, requesting a plurality of cluster devices external to the apparatus and to the plurality of clients to scan the plurality of files for viruses, said requesting including sending an identifier and path of each of the plurality of files to the plurality of cluster devices; and receiving results from the plurality of cluster devices regarding the scanning of the plurality of files; and responding to said at least one of the plurality of clients regarding the requests according to the results.

9. The apparatus of claim 8, wherein sending an identifier and path of each of the plurality of files to the plurality of cluster devices is accomplished by using non-uniform memory access.

10. The apparatus of claim 8, wherein sending an identifier and path of each of the plurality of files to the plurality of cluster devices is accomplished by using a communications network.

11. The apparatus of claim 8, wherein sending an identifier and path of each of the plurality of files to the plurality of cluster devices is accomplished by using a direct connection.

12. The apparatus of claim 8, wherein responding to said at least one of the plurality of clients regarding the requests according to the results comprises:

for each of the plurality of files, sending the corresponding file to a client requesting the corresponding file if the results indicate that the corresponding file is safe to send.

13. The apparatus of claim 12, wherein a file is considered to be safe if the file is not infected with any virus.

14. A machine-readable medium having sequences of instructions stored therein which, when executed by a processor of a storage server, cause the processor to perform a process comprising:

receiving requests for a plurality of files maintained by the storage server from at least one of a plurality of clients of the storage server;

in response to the requests for the plurality of files, requesting a plurality of cluster devices that are external to the storage server and to the plurality of clients to scan the plurality of files for viruses, said requesting including sending an identifier and path of each of the plurality of files to the plurality of cluster devices; and receiving results from the plurality of cluster devices regarding the scanning of the plurality of files; and responding to said at least one of the plurality of clients regarding the requests according to the results.

15. The machine-readable medium of claim 14, wherein sending an identifier and path of each of the plurality of files to the plurality of cluster devices is accomplished by using non-uniform memory access.

16. The machine-readable medium of claim 14, wherein sending an identifier and path of each of the plurality of files to the plurality of cluster devices is accomplished by using a communications network.

17. The machine-readable medium of claim 14, wherein sending an identifier and path of each of the plurality of files to the plurality of cluster devices is accomplished by using a direct connection.

18. The machine-readable medium of claim 14, wherein responding to said at least one of the plurality of clients regarding the requests according to the results comprises:

for each of the plurality of files, sending the corresponding file to a client requesting the corresponding file if the results indicate that the corresponding file is safe to send.

19. The machine-readable medium of claim 14, wherein a file is considered to be safe if the file is not infected with any virus.

20. An apparatus comprising:

a processor;

a mass storage facility, the mass storage facility storing a plurality of files;

a network interface through which to communicate with a plurality of clients;

a memory coupled to the processor, the memory storing instructions which when executed by the processor, cause the processing system to perform a process, the process comprising:

receiving a first request for a file of the plurality of files from a first client of the plurality of clients;

in response to the first request, requesting a cluster device of a plurality of cluster devices external to the apparatus and to the plurality of clients to scan the file for viruses, said requesting including sending an identifier and path of each of the plurality of files to the cluster device of the plurality of cluster devices; and receiving a result from the cluster device regarding the scanning of the file; and responding to the first request by sending the file to the first client if the result indicates that the file is not infected with any virus.

21. The apparatus of claim 20, wherein the process further comprises:

storing the result;

receiving a second request for the file from a second client of the plurality of clients; and determining whether it is safe to send the file to the second client based on the result.

* * * * *